United States Patent [19]
Heltzen

[11] 3,813,018
[45] May 28, 1974

[54] COLLAPSIBLE LUGGAGE POUCH FOR MOTORCYCLES

[76] Inventor: John H. Heltzen, 1435 W. 15th St., Long Beach, Calif. 90813

[22] Filed: Feb. 25, 1972

[21] Appl. No.: 229,404

[52] U.S. Cl. ............. 224/33 R, 224/32 R, 224/8 R, 190/43
[51] Int. Cl. ................................................ B62j 7/04
[58] Field of Search .... 224/32 R, 33 R, 33 A, 32 A, 224/30 R, 30 A, 8 R, 25 A; 150/DIG. 1, 52 R; 190/60, 43; 280/289; 297/191, DIG. 9

[56] References Cited
UNITED STATES PATENTS
2,479,824   8/1949   Fass .............................. 190/43 UX
3,014,759   12/1961   Bing .............................. 224/29 P X

FOREIGN PATENTS OR APPLICATIONS
1,089,832   3/1955   France .............................. 224/32 R
85,055   12/1935   Sweden ............................ 224/33 R
135,250   11/1933   Austria ............................. 224/8 R

*Primary Examiner*—Robert G. Sheridan
*Assistant Examiner*—Jerold M. Forsberg
*Attorney, Agent, or Firm*—Lyon & Lyon

[57] ABSTRACT

A collapsible luggage pouch including a rigid mounting member arranged for mounting on the back side of the back supporting cushion between the upright bars which support the cushion; a pouch having a closable access opening at its back side and a closure therefor capable of receiving a padlock, the container capable of being extended rearwardly from the seat back to receive luggage such as a motorcyclist's helmet, as well as being folded against the seat back with a portion of the pouch projecting below the seat back; and separable fasteners for securing the container in its folded condition.

5 Claims, 6 Drawing Figures

PATENTED MAY 28 1974  3,813,018

COLLAPSIBLE LUGGAGE POUCH FOR MOTORCYCLES

BACKGROUND OF THE INVENTION

Motorcycles are usually provided with a horizontal luggage rack behind the seat. Luggage is usually secured to the rack by use of straps. A problem is encountered in the storage of protective helmets when the motorcycle is not in use. The globular shape of the helmet poses a problem should it be desired to attach to the rack. As a consequence the helmet is often hung over a handle bar from which it is easily stolen. Often it is desirable to carry small packages such as lunches, books and the like; which, though capable of being secured by a strap, may be crushable or require its own container which is separate from the rack. It may be undesirable to carry the container when one departs from the motorcycle or if taken from the motorcycle, may be forgotten.

SUMMARY OF THE INVENTION

The present invention is directed to a luggage pouch for use on motorcycles which solves the background problems indicated and is summarized in the following objects:

First, to provide a luggage pouch which is capable of being mounted on the rear side of a motorcycle back rest, and which may be readily secured in an inconspicuous folded position or opened so as to extend over the motorcycle rack for partial support thereby.

Second, to provide a luggage pouch as indicated in the preceding object wherein the pouch is so arranged as to fold in a relatively flat condition against the motorcycle back rest with a portion projecting below the back rest into a space between the back rest and seat thus permitting the pouch to have maximum dimension and yet remain inconspicuous when not in use.

Third, to provide a luggage pouch which includes a novelly arranged slidable closure capable of being locked when closed.

Figures 1, 2:
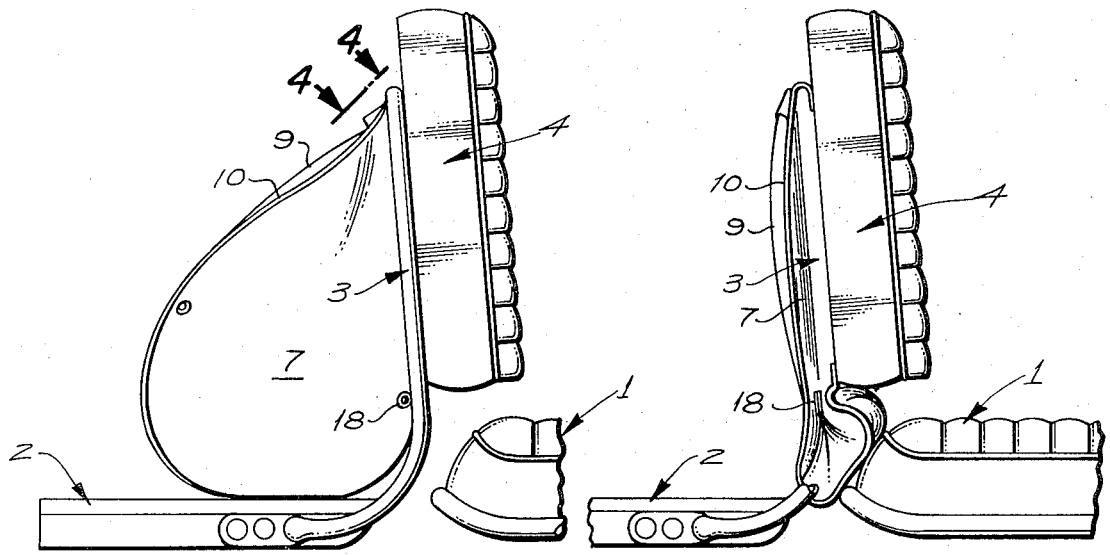
FIG. 1 is a fragmentary side view showing a motorcycle seat, back rest and luggage rack with the collapsible luggage pouch shown in its collapsed condition.
FIG. 2 is a similar fragmentary side view showing the collapsible luggage pouch in its extended position.
Figure 3:
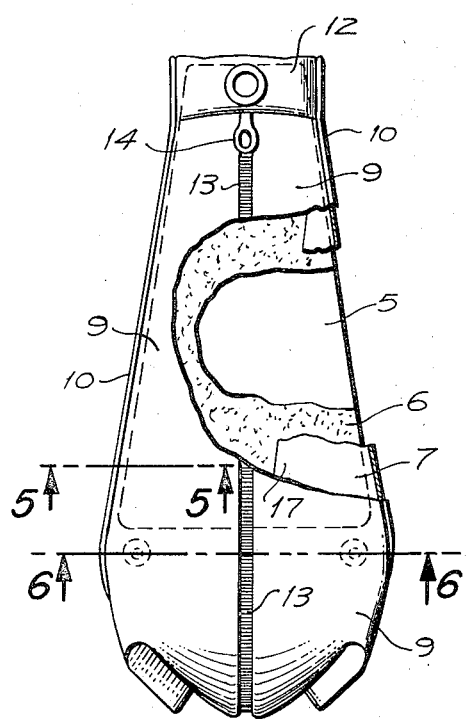
FIG. 3 is an enlarged rear view of the luggage pouch shown in its collapsed position.
Figure 4:
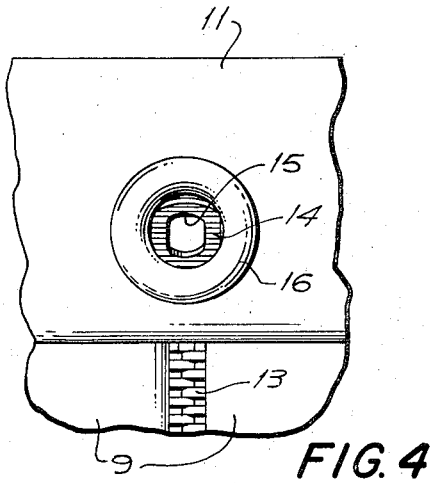
FIG. 4 is a further enlarged fragmentary rear view of the upper portion of the collapsible luggage pouch to illustrate the manner in which the slidable fastener may be secured.

The collapsible luggage pouch is intended to be mounted on a motorcycle. The parts of the motorcycle adjacent the luggage pouch includes a motorcycle seat 1 of which only the rear portion is indicated and behind which is a luggage rack 2 having upwardly extending back rest supporting bars 3 to which is secured a back rest 4 containing a mounting plate, not shown, for attachment to the supporting bars 3.

The construction described may vary substantially and the means of supporting the various parts may also vary. Essential to the present invention is that the motorcycle is provided with a back rest and that there is a space below the back rest. The luggage rack 2 performs an important function with regard to the luggage pouch but in some cases may be omitted.

The luggage pouch includes a mounting plate 5 which may be formed of wood and is dimensioned to fit on the back side of the back rest 4 between the supporting bars 3. The plate 5 may be provided with a pad 6. The pouch includes a pair of side members 7 formed of flexible material and having side margins 8 which are suitably secured by staples or other fastening means to the side of the mounting plate confronting the back rest 4.

The side members increase in size toward the lower end of the mounting plate 5 and each side member is joined to a central member 9 by a reinforcing seam 10. The side members 7 are also joined to a bottom strip 11 and a cap strip 12 the extended ends of which are joined by staples, or the like, to the bottom portion and top portion respectively of the mounting plate 5. A portion of the cap strip 12 overlies and is spaced from the central members 9.

The central members are connected by a slide fastener 13 which includes a pull tab 14 having a perforation 15. The upper end of the slide fastener extends under the cap strip 12 and the cap strip 12 is provided with a reinforcing loop 16.

The pull tab 14 may be dimensioned for insertion through the reinforcing loop 16 so as to receive a padlock not shown, or a padlock may be inserted through both the perforation 15 and the reinforcing loop 16.

Figure 5:
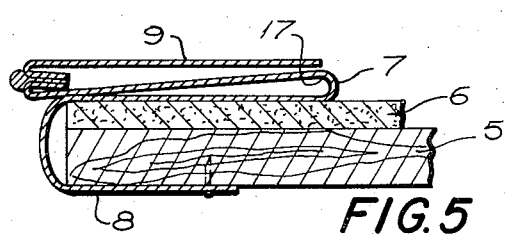
FIG. 5 is an enlarged fragmentary transverse sectional view taken through 5—5 of FIG. 3.
Figure 6:
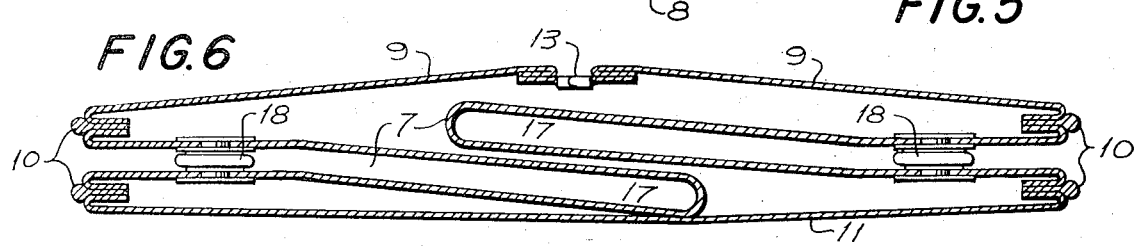
FIG. 6 is an enlarged transverse sectional view taken through 6—6 of FIG. 3.

The collapsible pouch is movable between an extended position shown in FIG. 2 and a folded position shown in FIG. 1. In the latter case the central members 9 form inwardly folded portions 17 which increase in depth toward the lower ends of the side members 7 as illustrated in FIGS. 5 and 6. The side members are dimensioned to project below the mounting plate 5 and the back rest 4.

In the region immediately below the mounting plate 5 each side member 7 is provided with a pair of separable fastener elements 18 one member of each element being adjacent to side margin 8 and the other adjacent to seam 10 so that when the fastener elements are joined the pouch is secured in a flat condition as shown in FIG. 1 and projects below the back rest 3 into the space behind the motorcycle seat 1. When the fastener elements are separated the pouch may be expanded as shown in FIG. 2 and its lower end may rest on the luggage rack 2.

While a particular embodiment of this invention has been shown and described, it is not intended to limit the same to the details of the construction set forth, but instead, the invention embraces such changes, modifications and equivalents of the various parts and their relationships as come within the purview of the appended claims.

I claim:

1. A luggage pouch for attachment to a motorcycle back rest situated above and at the rear of a motorcycle seat, the luggage pouch comprising:

a. a mounting plate for attachment in a vertical position to the back side of the back rest;

b. flexible pouch forming members secured to the mounting plate, and movable between a position extended from the mounting plate, and a folded position contiguous to the mounting plate;

c. a slide fastener dividing the pouch forming members for access to the pouch; and d. separable fastener elements on the pouch forming members for securing the pouch forming members in said folded position.

2. A luggage pouch as defined in claim 1, wherein:

a. the pouch formed by said members increases in size toward the lower end of the mounting plate and, when folded, continues below the back rest for retention in back of the seat.

3. A luggage pouch as defined in claim 1, wherein:

a. a cap strip having a marginally reinforced aperture overlies an end of the slidable fastener;

b. and the slidable tab is perforated for cooperation with the reinforced aperture, when the slide fastener is closed, to receive a padlock, thereby to secure the pouch in its closed position.

4. A luggage pouch for attachment to a motorcycle back rest situated above and between a motorcycle seat and a horizontal luggage rack, the luggage pouch comprising:

a. a mounting plate for attachment to the back side of the back rest;

b. a flexible pouch structure secured to the mounting plate, the pouch increasing in size toward the lower end of the back rest and movable between an expanded position overlying and partially supported by the luggage rack, and a collapsed position contiguous to the back rest wherein the lower portion of the pouch protrudes below the back rest, behind the seat and forwardly of the luggage rack;

c. separable fasteners at opposite sides of the pouch for securing the pouch in its collapsed position;

d. and a slidable fastener separating the pouch to provide access thereto.

5. A luggage pouch as defined in claim 4, wherein:

a. the slidable fastener includes a perforated pull tab;

b. and means is provided at an end of the separable fastener for cooperation with the pull tab to receive a locking means thereby to secure the pouch in its closed position.

* * * * *